Feb. 4, 1964
P. J. GRESHAM
3,120,372
PILOT-OPERATED DIAPHRAGM VALVE
Filed Oct. 13, 1961
2 Sheets-Sheet 1
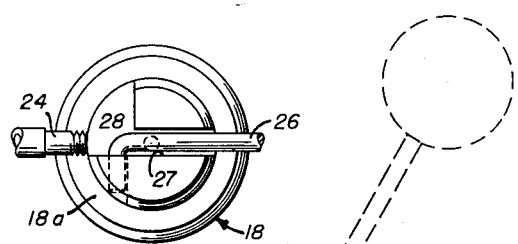
Fig. 2
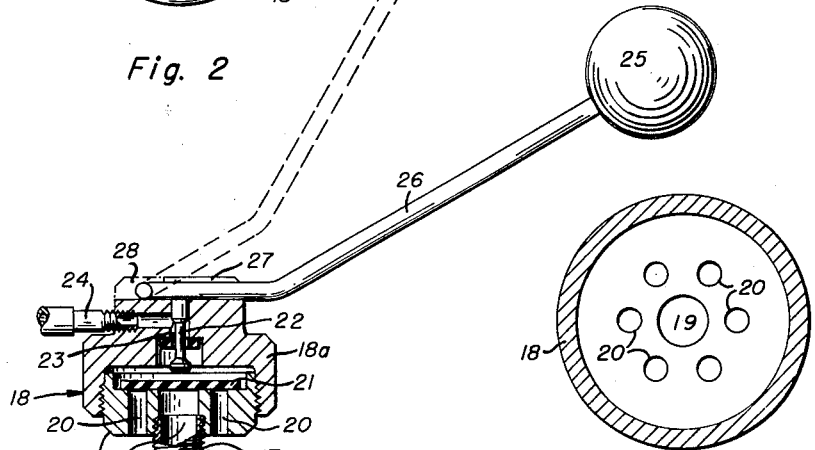
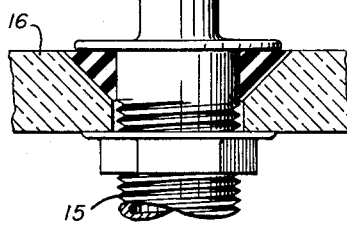
Fig. 1
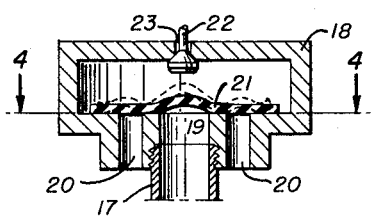
Fig. 3
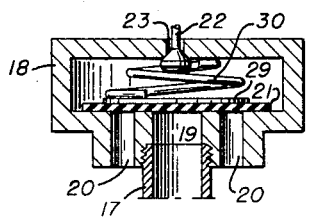
Fig. 5
INVENTOR.
PAUL J. GRESHAM
BY
ATTORNEY Feb. 4, 1964            P. J. GRESHAM            3,120,372
                PILOT-OPERATED DIAPHRAGM VALVE
Filed Oct. 13, 1961                      2 Sheets-Sheet 2

INVENTOR.
PAUL J. GRESHAM
BY
ATTORNEY

United States Patent Office 3,120,372
Patented Feb. 4, 1964

3,120,372
PILOT-OPERATED DIAPHRAGM VALVE
Paul J. Gresham, Rte. 3, McAlester, Okla.
Filed Oct. 13, 1961, Ser. No. 144,861
11 Claims. (Cl. 251—43)

This invention relates to valves of generally-conventional type operable in regulable reaction to input line pressure to control flow of liquid therethrough, and more particularly to such valves characterized by a moderately-flexible diaphragm adapted to function as the flow control element thereof, and has as an object to provide a novel and improved such valve distinguished by simplicity, operative reliability, wide adaptability, and efficient performance in reaction to extensive variability of input line pressure and in exposure to liquids diverse as to purity and degree of contamination.

A further object of the invention is to provide a novel and improved pilot-operated diaphragm valve particularly adapted for inclusion in and to function as the flow-regulating component of a ball cock organization appropriate for conventional correlation with a flush tank.

A further object of the invention is to provide a novel and improved pilot-operated diaphragm valve that is amenable to functional regulation and control in reaction to any one of various types and constructions of pilot valves expedient of association therewith.

A further object of the invention is to provide a novel and improved pilot-operated diaphragm valve that is inherently quiet and anti-siphoning in effect as an operating component of a ball cock organization.

A further object of the invention is to provide a novel and improved pilot-operated diaphragm valve that is automatically and positively responsive for control of liquid flow therethrough to differential of pressures established by and proportioned to the input line pressure of the liquid supply to the valve.

A further object of the invention is to provide a novel and improved pilot-operated diaphragm valve organized to effect positive and complete interruption of liquid input thereto in reaction to a pressure factor derived from and of a degree considerably less than that of the input supply pressure.

A further object of the invention is to provide a novel and improved pilot-operated diaphragm valve that is susceptible as a component of a ball cock organization of automatic functional reaction with particular advantage to float-actuable means distinctively and operably correlated with the ball cock.

A further object of the invention is to provide a novel and improved pilot-operated diaphragm valve that is self-flushing to pass and to eliminate particulate matter possibly entrained with the liquid input to the valve and therein possibly inhibitive of effective valve operation.

A further object of the invention is to provide a novel and improved pilot-operated diaphragm valve that is distinguished by means uniquely effective to establish and to maintain a differential pressure derived from and less than that of the input line pressure automatically operable to fully and positively close the valve against the pressure of the liquid input thereto.

A further object of the invention is to provide a novel and improved construction and organization of elements constituting a pilot-operated diaphragm valve of significant operating advantage.

A further object of the invention is to provide a novel and improved pilot-operated diaphragm valve that is susceptible of economical production in an extensive range of desired size and capacity from readily-available materials; that is applicable to the regulable control of various liquids impelled to flow under various, and variable, pressures; that is feasible of variation in construction within the contemplation and for realization of the advantages of the invention; and that is distinctively and positively efficient in attainment of the purposes for which designed.

With the foregoing and other objects in view, my invention consists in the construction, arrangement, and operative combination of elements as hereinafter set forth, pointed out in the appended claims, and illustrated by the accompanying drawings, in which—

FIGURE 1 is a somewhat diagrammatic, fragmentary, side elevational view, partially in section, of a ball cock organization exemplifying the principles of my invention as positioned for input of liquid to a conventional flush tank, alternative positions of a float-actuable control element being represented by broken lines.

FIGURE 2 is a top plan view of the organization according to FIGURE 1, with the flush tank omitted and the control element broken away to conserve space.

FIGURE 3 is a section, on a relatively-enlarged scale, axially of and through a typical diaphragm valve of the type shown in FIGURE 1 representing in broken lines and with some exaggeration reaction of the diaphragm to valve-closing influences.

FIGURE 4 is a section taken tranversely of the valve unit according to FIGURE 3 and substantially on the indicated line 4—4 thereof.

FIGURE 5 is a sectional view of the valve unit according to FIGURE 3 as modified within the contemplation of the invention for efficient operation at low input line pressure.

Figure 6:
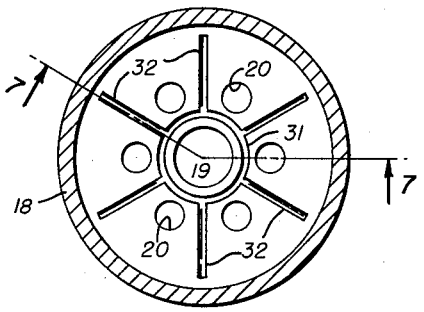
FIGURE 6 is a sectional view similar to FIGURE 4 showing, on a further-enlarged scale, advantageous modification of the valve seat previously illustrated.

Pilot-operated valves for the control and regulation of liquid input flow have long been known and utilized in various constructions and functional applications. Especially effective for automatic regulation of liquid input to a receiver in reaction to variation of the liquid level obtaining in the receiver, pilot-operated valves have proved to be popular for inclusion as flow-control components of ball cock organizations conventionally associated with flush tanks. Certain of the pilot-operated valves heretofore utilized as components of ball cocks, and otherwise, have employed a diaphragm element disposed to yield for delivery of liquid through the valve when the pilot valve feature is open and to close against the input pressure of the liquid when the pilot valve element is closed. In general, the pilot-operated diaphragm valves known to the art have been similarly organized as a chamber, a pilot valve of small flow capacity regulably controlling liquid passage to and from the upper portion of the chamber, a line for the input of liquid under pressure centrally through the floor of the chamber for delivery upwardly thereinto, liquid outflow passages opening through the chamber floor exteriorly about the input line, and a diaphragm element within the chamber adapted to overlie the liquid input and outflow passages; together with means accommodating the development of pressure derived from that of the liquid input within the chamber at the side of the diaphragm remote from the input in consequence of pilot valve closure and to a degree effective to seat and hold the diaphragm in flow-inhibiting obstruction over the functioning area of the input line and outflow passages. With a diaphragm area adequately exceeding the total open area of the combined input and outflow passages, the pilot-operated diaphragm valves hitherto known have appealed, in principle and theory, as reliably operable with intended purpose and effect, but in practical use the conventional such valves have evidenced some functional deficiency, such as a failure, particularly at low line pressures, to positively arrest input of liquid to the valve when the pilot valve control is closed, in consequence whereof there is leakage through the valve, and an incapacity to pass sediments and particulate matter entrained by contaminated flows without impairment of intended valve function. Customarily contrived with a small orifice, or "weep-hole," intersecting the diaphragm for translation of input line flow and pressure therethrough, or with a restricted channel bypassing the diaphragm in flow communication with the input line for feed of valve-actuating pressures to the chamber, conventional pilot-operated diaphragm valves are notoriously subject to functional impairment and failure resulting from obstruction and gradual closing of the "weep-hole," or the alternative restricted channel bypass, by accumulations and deposits therein of minerals and sediments entrained by the input flow. Experience, observation, and study having determined the factors responsible for the inadequacies and malfunctions of pilot-operated diaphram valves as heretofore known, the instant invention is hence directed to refinements thereof and improvements therein which obviate the noted, and other, deficiencies with consequent enhanced effectiveness and reliability of valve operation.

Typical of ball cock organizations effective through a pilot-operated diaphragm valve in use association with and to automatically recharge a flush tank, the arrangement according to FIGURE 1 includes the usual liquid input line 15 leading from an expedient source or supply of liquid under pressure in sealed relation through the floor 16 of a flush tank to terminate within the latter as an upwardly-directed nipple 17. The nipple 17 mounts a fitting 18, feasibly comprised of separable upper and lower components 18a and 18b, respectively, defining a circular, axially-shallow chamber wherewith the bore of said nipple communicates through an inlet passage 19 centrally of the planar floor of the fitting, and an orbital array of like holes 20 exteriorly and concentrically surrounds said passage 19 as a plurality of outlet passages opening from said chamber and through the planar floor of the fitting exteriorly about the line 15 and inwardly from the wall of the fitting bounding the floor for the delivery of flow input to the chamber from the said line to and for accumulation within the associated flush tank, the disposition of the outlet passages 20 hence establishing intact areas of the planar chamber floor separating adjacent outlets and at each side surrounding the orbital array thereof. A relatively-thin, circular, imperforate diaphragm 21 of flexible, water-impermeable material, such as rubber, is loosely accommodated within the chamber of the fitting 18 in a diameter slightly less than that of the chamber and sufficient to fully close over the coplanar inner ends of the passages 19 and 20 when resting upon the intact areas of the chamber floor, and a pilot valve of any appropriate type and construction, such as a conventional headed pin 22, is engaged to reciprocate in and to open and close a relatively-small outlet 23 centrally of and through the top closure, or component 18a, of the fitting 18, said pilot valve being arranged to close the passage 23 in reaction to pressure manifest interiorly of the chamber served by the line 15 and to open said passage when shifted inwardly toward said chamber against the pressure therein obtaining. In accord with usual practice, the passage 23 desirably connects with a line 24 for the direction and delivery of outflow released through the passage.

Shift of the headed pin 22 to open the passage 23 of the pilot valve is conventionally the function of a float 25 adapted to rise and fall in attachment to one end of an arm 26 as it is buoyantly supported upon and moved with the surface level of the liquid charge present in the associated flush tank, and in an arrangement of advantageous utility and practicality the upper end of the fitting 18, or component 18a, is diametrically grooved, as at 27, to embrace a length of the arm 26 and to intrusively receive the upper end of the headed pin 22 when the latter is elevated to close the passage 23 of the pilot valve, the wall at one side of said groove is shortened and cut away, as at 28, to expose to access a corresponding portion of the other wall of the groove, a hole for the reception of an end of the arm 26 is formed in and through the so-exposed wall portion of the groove at one side of and in a direction perpendicular to the axis of the headed pin 22, and the end of said arm 26 remote from the float 25 is bent to right-angular relation with the arm and revolubly entered in such hole to position the adjacent portion of the arm for reception within the groove 27 in overlying relation with the upper end of the headed pin, as is clearly represented by FIGURES 1 and 2. As should be apparent, the arm 26 carrying the float 25 may be swung in a vertical arc about the pivotal engagement of its bent end with one wall of the groove 27 away from coaction with the headed pin 22, whereby to release the latter for closing of the passage 23 of the pilot valve, and to a position where the arm and float is removed from interference with attentions of a workman and feasible of complete detachment from the fitting, if such be desired. When operatively related with the fitting 18, as shown and described, a lowering of the charge level in the flush tank is reflected by the float 25 as corresponding swing of the arm 26 about its pivotal connection with the fitting and to reception within the groove 27 where ultimately the weight of the arm and float acts upon and to depress the headed pin 22 with consequent opening of the passage 23 of the pilot valve. Thus operated, the pilot valve remains open until replenishment of the flush tank charge elevates the float sufficiently to lift the arm 26 away from the headed pin 22 which is thereby freed to close the passage 23 in reaction to pressures obtaining within the chamber of the fitting 18 as a consequence of maintained pressurized input thereto through the line 15.

Operatively organized as shown and described, the chamber of the fitting 18 is at all times filled with inflow from the line 15 which circulates through the clearance provided about the periphery of the diaphragm 21 to fully charge the chamber above, as well as below, the diaphragm. When the pilot valve is open, enough of the chamber charge may escape therethrough to lower the pressure in the upper portion of the chamber below that of the input supply which accordingly acts to elevate the diaphragm for delivery of input to the associated tank, or receiver, through the chamber and the outlet passages 20 in the floor thereof. Itself subject to pressure manifest in the upper portion of the chamber, the pilot valve is impelled to close when released by the arm 26 and thereby promote a rise of chamber interior pressure into approximate balance with that of the input supply, which increase of chamber interior pressure acts upon an upper surface area of the diaphragm much greater than the under surface area similarly exposed and hence applies, as it approaches balance with the input supply pressure, to close the diaphragm over and against the intact areas of the floor of the chamber to first restrict the outflow passages 20 and ultimately interrupt input to the chamber despite the supply pressure. Since the area of the chamber floor occupied by the outflow passages 20 offers no resistance to closing of the diaphragm thereover, the input line pressure is applied directly to but a small central area of the under surface of the diaphragm, and the opposed chamber floor and diaphragm under surface areas between which the supply pressure is effective to elevate the diaphragm are in sum much less than the upper surface area of the diaphragm, chamber interior pressure increase resulting from closure of the pilot valve is frequently effective to seat and seal the diaphragm as a positive interruption of input to and outflow from the chamber well before the chamber pressure attains balance with the supply pressure. As represented by broken lines in FIGURE 3, closing of the relatively-thin, imperforate, flexible diaphragm member characteristic of the invention to interruption of flow delivery through the chamber of the fitting 18 is a progressive function attended by undulations of the diaphragm. Increase of chamber interior pressure resulting when the pilot valve is closed acts first, and before sufficient to overcome the pressure of the input, on the relatively-extensive peripheral band of the upper surface of the diaphragm to close the latter marginally to the floor of the chamber and partially over the outflow passages 20 while the pressure of the input elevates the center of the diaphragm as a hump beneath which input continues seeking access to the outflow passages and chamber interior. Velocity of previous flow between opposed areas of the diaphragm and chamber floor was reflected by reduced pressure which permitted marginal seating of the diaphragm in reaction to moderate rise of the chamber interior pressure, hence arrest of such flow as the diaphragm is marginally closed to the floor of the chamber nullifies the velocity effect and occasions a resurge of full supply pressure acting and effective to slightly and briefly lift the seated areas of the diaphragm from the opposed chamber floor areas for passage therebetween and about the margin of the diaphragm of pressurized input increments enhancive of the chamber interior pressure thereby ultimately augmented, through exceedingly rapid repetition of the cycle, to a value capable of holding the diaphragm closed to the floor of the chamber against the force of the input supply thereto until the pilot valve is opened to relieve the pressure so developed interiorly of the chamber.

There are, obviously, certain relationships and proportions significant to successful and satisfactory operation of the relatively-thin, imperforate, flexible diaphragm as the flow control element of a pilot-operated valve within the contemplation of the invention. The combined capacity of the outflow passages 20 should, naturally, equal or exceed the input supply to the chamber of the fitting 18, and the number and consequent angular spacing of said outflow passages should be such as to provide therebetween uninterrupted areas of the floor of the chamber of the fitting 18 above which the diaphragm may lift in reaction to pressure of the input supply for the transfer of pressure increments to the chamber, as above explained, without impairing the closure of the outflow passages effected by the diaphragm upon first pressure rise within the chamber.

Exemplary of the relationships and principles above discussed, the simple arrangement of six like outflow passages 20 uniformly spaced apart in an orbital array concentric with the inlet passage 19 to intersect the smooth, flat floor of the chamber defined by the fitting 18 as represented by FIGURES 1, 3 and 4 has been found to give satisfactory results in cooperation with the relatively-thin, imperforate, flexible diaphragm 21 as a positive flow control for uncontaminated, sediment-free liquids input through the passage 19 at line pressures above seven pounds to the square inch, below which value leakage through the diaphragm-closed valve may occur. As is well known, line pressures of water supply systems may vary widely in reflection of demand, user location, and other factors, in anticipation whereof the valve arrangement according to FIGURES 1, 3 and 4 may be conditioned to obviate leakage at low line pressures through the provision, as shown by FIGURE 5, of a stiff backing disk 29 disposed to overlie the central area of the upper surface of the diaphragm 21 and an expansive spring 30 lightly tensioned between said disk and the top wall of the fitting chamber to bias the disk and subjacent area of the diaphragm in resistance to the pressure of supply input to the chamber.

Figure 7:
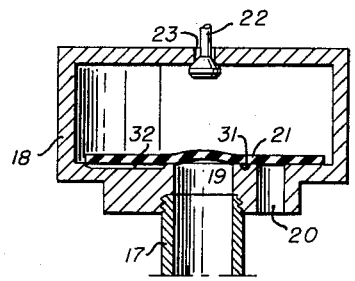
FIGURE 7 is a sectional view taken axially and substantially on the indicated line 7—7 of FIGURE 6.

In an alternative and preferred arrangement eliminating the disk 29 and spring 30, the valve organization typified by FIGURES 1, 3 and 4 may be conditioned to function positively and without leakage at any and all line pressures in the manner and by means of the unique features represented by FIGURES 6 and 7. As shown in the view last noted, a narrow, shallow, annular groove 31 is formed in the flat floor of the fitting chamber concentrically between and out of communication with the inlet passage 19 and orbital array of outlet passages 20 in feeding relation with one or more straight, otherwise similar, grooves 32 radially interrupting the chamber floor to bisect the angular spacing between adjacent passages 20 and to extend from the groove 31 to the periphery of the diaphragm 21. The diaphragm having been initially closed to the floor of the chamber in reaction to closing of the pilot valve, as above explained, the groove 31 functions to receive and collect increments of pressure derived from the input supply which is effective, even at low line pressure, to lift the diaphragm away from sealing contact with the annular collar separating the said groove and inlet passage 19, and the groove, or grooves, 32 pass such pressure increments from the groove 31 radially under and to delivery past the margin of the diaphragm with minimal resistance, there being now no need to lift the diaphragm from the chamber floor to accommodate such pressure flow, until the resulting chamber pressure acting against the upper surface of the diaphragm is adequate to close the latter into sealing coaction with the collar surrounding the inlet passage and with the intact floor areas surrounding the outlets. Obviously, the grooves 31 and 32 operates as above described to assure positive closing of the diaphragm valve in reaction to closing of the pilot valve, even at very low line pressures.

Figure 8:
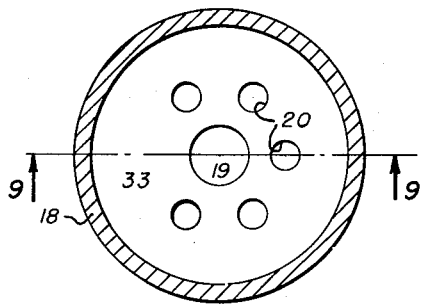
FIGURE 8 is a sectional view similar to FIGURE 6 showing a yet further modification of the valve seat within the contemplation of the invention.
Figure 9:
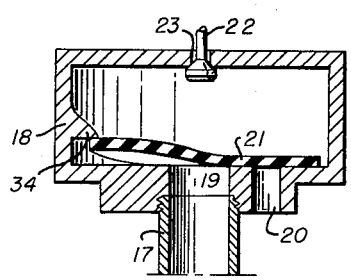
FIGURE 9 is a sectional view taken axially and substantially on the indicated line 9—9 of FIGURE 8.

In a construction dispensing with the grooves in the floor of the fitting chamber wherein the number, but not the correlation, of the outflow passages 20 is inconsequential, the valve embodiment according to FIGURES 8 and 9 is the functional equivalent of that represented by FIGURES 6 and 7 and similarly capable of reliable operation at any and all line pressures. A distinctive and critical feature of the constuction according to FIGURES 8 and 9 is a discontinuity in the orbital array of outflow passages 20 such as to establish an uninterrupted chamber floor area, indicated by the numeral 33, at least seventy-two degrees in angular extent between and separating one pair of adjacent passages 20, over and above the outer arc margin of which area 33 a stop 34 intrudes from the inner wall of the fitting 18 to spacedly overhang, and to limit upward deflection of, the periphery of the diaphragm 21, which stop, obviously, might well be the top closure of the fitting chamber in a shallow version thereof. The angularly-wide chamber floor area 33 and the area of the diaphragm opposed thereto readily separate to pass increments of very low line pressure to the fitting chamber after the pilot valve has been closed and the diaphragm initially seated in covering relation with the outlet passages 20, whereby to ultimately perfect closure of the diaphragm valve, and the stop 34 restrains lift of the diaphragm when the pilot valve is open to thereby inhibit such increase of chamber pressure as might serve to close the diaphragm over the passages 20 and nullify intended operation of the valve.

Figure 10:
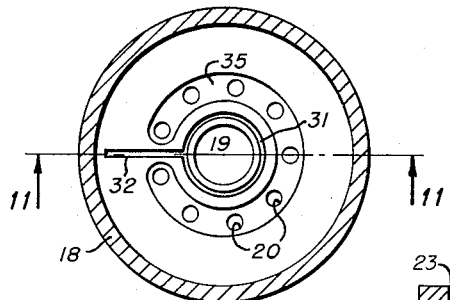
FIGURE 10 is a sectional view similar to FIGURES 6 and 8 showing yet another modification of the valve seat within the contemplation of the invention.
Figure 11:
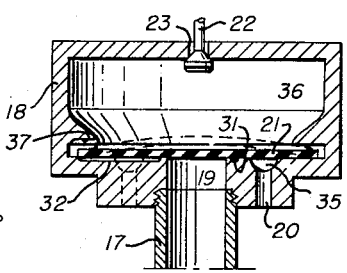
FIGURE 11 is a sectional view taken axially and substantially on the indicated line 11—11 of FIGURE 10.

Utilizing the annular groove 31 with a single radial connecting groove 32 in association with an orbital array of outflow passages 20 of any expedient number and uniform angular spacing, substantially as represented by FIGURES 6 and 7, the modification according to FIGURES 10 and 11 is adapted to manifest the operating advantages of the preceding arrangements with the supplementing capability of passing sediments and contaminants normally promotive of leakage in diaphragm-type valves. Distinguishing the construction according to FIGURES 10 and 11 is the provision of a relatively-capacious, interrupted, annular channel 35 sunk in the chamber floor to embrace and to communicate with upper ends of all of the outflow passages 20 and to terminate at opposite sides of and out of communication with the single radial groove 32 in surrounding, non-communicating relation with the annular groove 31, and an annular retainer 36 intruding from the inner wall of the fitting 18 to closely overlie and restrain the periphery of the diaphragm 21. Marginally held by the retainer 36 subject to the pressure of line supply through the inlet passage 19 when the pivot valve is open, the diaphragm 21 flexes and domes upwardly to freely pass the input liquid to and flush the same through the channel 35 and communicating outflow passages 20 without retention of sediments and contaminants; desired flexing of the diaphragm to a wide clearance over the inlet passage being stimulated by engagement of the diaphragm margin against the retainer 36 to substantially inhibit input of pressure increments to the chamber about the margin of the diaphragm and restriction of flow and pressure access to the chamber above the diaphragm to that which will pass through a shallow groove 37 radially intersecting the lower face of the retainer 36 in opposition to the outer end of the groove 32. In the embodiment last described there is but little pressure in the chamber to oppose upward flexing of the diaphragm when the pilot valve is open and free, flushing flow of input obtains to and through the passages 20, but when the pilot valve is closed the grooves 31, 32 and 37 pass pressure increments to the chamber above the diaphragm, as previously set forth, to effect full and positive closure of the diaphragm valve.

Figure 12:
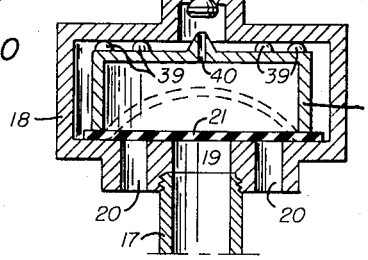
FIGURE 12 is a sectional view similar to FIGURES 3, 5, 7, 9 and 11 axially through an embodiment of the typical valve within the contemplation of the invention as contrived for effective flow regulation of liquids burdened with entrained sediments.

Adaptable to function with any of the chamber floor arrangements illustrated and heretofore described for the regulation and control of contaminated and sediment-bearing liquid flows, the organization according to FIGURE 12 includes a cup-like member 38 accommodated within the chamber of the fitting 18 to bear at its rim in inverted relation over the diaphragm 21. The member 38 is less in diameter than the diaphragm 21, whereby to establish an annular clearance thereabout with respect to the surrounding chamber wall, and is sized to be held in clearing relation with the top closure of the chamber by means of spacing lugs or buttons 39, in which disposition and relationship the said member 38 divides the fitting chamber portion above the diaphragm into a pressure compartment interiorly of the member and a flow compartment exteriorly thereabout communicating between the pilot valve outflow and the pressure and flow passages served by the supply line input. Furnished with a vent 40 opening to its interior in registration with the pilot valve outflow, the member 38 stimulates and promotes high-dome flexure of the central area of the diaphragm 21 away from the inlet passage 19 for free flushing traverse of liquids through the open valve. With the pilot valve open there is practically no pressure interiorly of the member 38 and the line pressure of the supply is effective to elevate the diaphragm well above the inlet, during which open condition of the diaphragm valve flow and pressure increments bypassed to the chamber continue exteriorly of the member 38 to escape through the open pilot valve without effecting increase of pressure interiorly of the member. Even though there be at no time any appreciable amount of liquid within the member 38, closing of the pilot valve results in rise of chamber pressure, as above explained, exteriorly of and about the member and is reflected by compression of the charge interiorly of the member, mostly vapor with minor liquid content, ultimately adequate to seat the diaphragm and thereby close the valve.

In operative association with a ball cock organization as typified by FIGURE 1, each specific embodiment of the diaphragm valve of the invention illustrated and herein described effects positive and reliable regulation of liquid flow therethrough in reaction to pilot valve control, is quiet in action, and anti-siphoning in function. With the possible exception of the arrangement according to FIGURE 12, each of the diaphragm valve constructions of the disclosure serves as an automatic pressure regulator for total delivery of liquid therethrough largely independent of input line pressure, since the amount of liquid fed past the diaphragm and the consequent pressure acting on the upper surface of the latter being functions of the input line pressure, variations of the line pressure are reflected at the periphery of the diaphragm to restrict outflow from the valve at and in proportion to higher line pressures and to correspondingly favor capacity outflow at lower such pressures.

Since variations, modifications, and changes in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A pilot-operated diaphragm valve comprising a fitting defining a chamber formed with a planar floor, an inlet for fluid under pressure centrally through and terminating in an intact plane area of said floor, an orbital array of spaced outlets through said floor exteriorly about said inlet and inwardly from the chamber wall peripherally bounding said floor, whereby to establish an intact plane area of the floor entirely surrounding the flow communication of said outlets with said chamber, a flexible, imperforate diaphragm of less area than said floor loosely housed in said chamber adapted to coact at times with the intact plane areas of the floor about said inlets and outlets as a closure over said inlet and outlets effective to inhibit fluid transfer from said inlet to said outlets, from said inlet to said chamber, and from said chamber to said outlets, a vent in said chamber at the side of the diaphragm remote from said floor, and means for selectively closing and opening said vent for consequent shift of said diaphragm between closing coaction with and separation from the chamber floor in reaction to fluid pressure manifest at said inlet.

2. The organization according to claim 1, wherein said outlets are uniformly spaced apart and individually terminate in an intact plane area of the floor.

3. The organization according to claim 1, wherein said diaphragm is supplemented by a stiff disk overlay at its side remote from the floor and is spring-biased through said disk toward said floor.

4. The organization according to claim 1, wherein said outlets terminate in an incomplete annular channel intersecting the planar chamber floor and end-closing therein against opposite sides of an intact area of the floor interrupting the same.

5. The organization according to claim 1, wherein said chamber houses an inverted cup marginally engaging said diaphragm inwardly adjacent the periphery thereof in a maintained separation from contiguous areas of the chamber enclosure, whereby to divide the chamber at the side of the diaphragm remote from the floor into a pressure cell closed over the central area of the diaphragm and a fluid flow compartment exteriorly about said cell, and a passage opens through the base of said cup in registration with said vent.

6. The organization according to claim 1, wherein an annular groove interrupts the otherwise intact area of the floor between and out of communication with the inlet and outlets in flow connection with a like groove in the otherwise intact area of the floor between adjacent outlets extending radially beneath and to the periphery of the diaphragm.

7. The organization according to claim 1, wherein an annular groove interrupts the otherwise intact area of the floor between and out of communication with the inlet and outlets in flow connection with a plurality of like grooves individually interrupting the otherwise intact areas of the floor between adjacent outlets and each extending radially beneath and to the periphery of the diaphragm.

8. The organization according to claim 1, wherein said outlets terminate in an incomplete annular channel intersecting the planar chamber floor and therein end-closing against opposite sides of an intact area of the floor interrupting the same and an annular groove interrupts the otherwise intact area of the floor between and out of communication with the inlet and said channel in flow connection with a like radial groove in the otherwise intact area of the floor interrupting said channel beneath and extending to the periphery of the diaphragm.

9. The organization according to claim 1, wherein said outlets terminate in an incomplete annular channel intersecting the planar chamber floor and therein end-closing against opposite sides of an intact area of the floor interrupting the same, an annular groove interrupts the otherwise intact area of the floor between and out of communication with the inlet and said channel in flow connection with a like radial groove in the otherwise intact area of the floor interrupting said channel beneath and extending to the periphery of the diaphragm, a retainer fixedly intrudes from the fitting spacedly over and about the periphery of the diaphragm, and a groove intersects the area of said retainer opposed to the diaphragm in registration with the outward end of said radial groove.

10. The organization according to claim 1, wherein said chamber houses an inverted cup marginally engaging said diaphragm inwardly adjacent the periphery thereof in a maintained separation from contiguous areas of the chamber enclosure, whereby to divide the chamber at the side of the diaphragm remote from the floor into a pressure cell closed over the central area of the diaphragm and a fluid flow compartment exteriorly about said cell, a passage opens through the base of said cup in registration with said vent, and an annular groove interrupts the otherwise intact area of the floor between and out of communication with the inlet and outlets in flow connection with at least one like groove in the otherwise intact area of the floor between adjacent outlets extending radially beneath and to the periphery of the diaphragm.

11. A pilot-operated diaphragm valve comprising a fitting defining a chamber formed with a planar floor, an inlet for fluid under pressure centrally through and terminating in an intact plane area of said floor, an incomplete orbital array of spaced outlets through said floor exteriorly about said inlet and inwardly from the chamber wall peripherally bounding said floor, said array being interrupted by a blank floor area exceeding in arc the spacing between contiguous outlets of the orbit thereby intercepted, whereby to establish an intact plane area of the floor intersected by, entirely surrounding, and separating with the provision of one arcuately-enlarged interval the flow communication of said outlets with said chamber, a flexible, imperforate diaphragm of less area than said floor loosely housed in said chamber adapted to coact at times with the intact plane areas of the floor about said inlet and outlets effective to inhibit fluid transfer from said inlet to said outlets, from said inlet to said chamber, and from said chamber to said outlets, a vent in said chamber at the side of the diaphragm remote from said floor, and means for selectively closing and opening said vent for consequent shift of said diaphragm between closing coaction with and separation from the chamber floor in reaction to fluid pressure manifest at said inlet.

References Cited in the file of this patent
UNITED STATES PATENTS
1,014,235    Laudet et al. _____ Jan. 12, 1912